(12) United States Patent
Kim et al.

(10) Patent No.: US 11,391,678 B2
(45) Date of Patent: Jul. 19, 2022

(54) DEVICE AND METHOD FOR DETECTING DEFECT OF OPTICAL FILM (71) Applicant: SHANJIN OPTOELECTRONICS (SUZHOU) CO., LTD., Zhangjiagang (CN)

(72) Inventors: Ho Jin Kim, Daejeon (KR); Myoung Gon Yang, Daejeon (KR); Hang Suk Choi, Daejeon (KR); Eung Jin Jang, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 215 days.

(21) Appl. No.: 16/632,198

(22) PCT Filed: Jul. 27, 2018

(86) PCT No.: PCT/KR2018/008511
§ 371 (c)(1),
(2) Date: Jan. 17, 2020

(87) PCT Pub. No.: WO2019/022551
PCT Pub. Date: Jan. 31, 2019

(65) Prior Publication Data
US 2020/0232932 A1      Jul. 23, 2020

(30) Foreign Application Priority Data

Jul. 28, 2017 (KR) .................. 10-2017-0096299

(51) Int. Cl.
*G01N 21/88* (2006.01)
*G01N 21/89* (2006.01)
(Continued)

(52) U.S. Cl.
CPC ....... *G01N 21/896* (2013.01); *G01N 21/8806* (2013.01); *G01N 21/8851* (2013.01);
(Continued)

(58) Field of Classification Search
CPC ....... G01N 2021/9513; G01N 21/8806; G01N 21/8851; G01N 21/896; G01N 21/95; G01N 2201/0636
See application file for complete search history.

(56) References Cited

U.S. PATENT DOCUMENTS

2020/0209167 A1 * 7/2020 Kim ............... G01N 21/896

FOREIGN PATENT DOCUMENTS

JP    2011085520    4/2011
JP    2011145082    7/2011
(Continued)

*Primary Examiner* — Mark R Gaworecki
(74) *Attorney, Agent, or Firm* — Schmeiser, Olsen & Watts, LLP (57) ABSTRACT

Provided is a device for detecting a defect of an optical film, comprising a light emitting unit, a reflection unit, a screen, and an image capturing unit, and a method for detecting a defect of an optical film, comprising emitting light to a reflection unit, projecting the light reflected by the reflection unit onto an optical film, capturing an image of a screen which displays a projection shape obtained by projecting the light onto the optical film, and analyzing the image.

9 Claims, 3 Drawing Sheets

(51) Int. Cl.
    *G01N 21/95*         (2006.01)
    *G01N 21/896*      (2006.01)

(52) U.S. Cl.
    CPC ..... *G01N 21/95* (2013.01); *G01N 2021/9513* (2013.01); *G01N 2201/0636* (2013.01)

(56) References Cited

FOREIGN PATENT DOCUMENTS

| | | |
|---|---|---|
| JP | 2012078144 | 4/2012 |
| JP | 2012078144 A * | 4/2012 |
| JP | 2012-215566 | 11/2012 |
| JP | 2014234999 | 12/2014 |
| KR | 10-20070034928 | 3/2007 |
| KR | 10-0769326 | 10/2007 |
| KR | 10-1082699 | 11/2011 |
| KR | 10-1464877 | 11/2014 |

* cited by examiner

Example 1          Comparative        Comparative
                   Example 1          Example 2

DEVICE AND METHOD FOR DETECTING DEFECT OF OPTICAL FILM

CROSS-REFERENCE TO RELATED APPLICATIONS

This application is a National Stage Application of International Application No. PCT/KR2018/008511 filed on Jul. 27, 2018, which claims priority to Korean Patent Application. No. 10-2017-0096299 filed in the Korean Intellectual Property Office on Jul. 28, 2017, the entire contents of which are incorporated herein by reference.

TECHNICAL FIELD

The present invention relates to a device and a method for detecting a defect of an optical film.

BACKGROUND ART

Optical films having optical characteristics are used to manufacture display units including liquid crystal displays (LCDs), organic light emitting diodes (OLEDs), plasma display panels (PDPs), electrophoretic displays (EPDs), and the like. In general, the optical film has a structure in which polarizing films having optical characteristics and protective films for protecting the polarizing films are stacked on one another.

During a process of manufacturing and transporting the optical film, defects having various shapes can occur in/on the optical film in certain situations such as when foreign substances are introduced into the optical film, the optical film is crushed, a surface of the optical film is stabbed, or the optical film is wrinkled. The aforementioned defects can cause defects of display units manufactured by using the optical film.

Therefore, there is a need for a technology capable of detecting defects having various shapes existing in/on the optical film.

Korean Patent No. 10-1082699 (hereinafter, referred to as Patent Document 1) proposes a device for detecting a defect of an optical film by capturing an image of the optical film. Patent Document 1 discloses that the optical film is tested by allowing light emitted from a light source to penetrate through the optical film so that an image of the optical film is captured by an image capturing means installed at a position facing the light source.

DOCUMENT OF RELATED ART

Patent Document

Patent Document 1: Korean Patent No. 10-1082699

DISCLOSURE

Technical Problem

The present specification has been made in an effort to provide a device and a method for detecting a defect of an optical film.

Technical Solution

An exemplary embodiment of the present invention provides a device for detecting a defect of an optical film, the device including: a light emitting unit which emits light; a reflection unit which reflects the light emitted from the light emitting unit and guides the light to the optical film; a screen which displays a projection shape obtained by projecting the light on the optical film to detect a defect of the optical film; and an image capturing unit which captures an image of the projection shape displayed on the screen.

Another exemplary embodiment of the present invention provides a method of detecting a defect of an optical film, the method including: emitting light to a reflection unit; projecting the light reflected by the reflection unit on the optical film; obtaining an image by capturing the image of a screen which displays a projection shape obtained by projecting the light on the optical film to detect a defect of the optical film; and detecting the defect of the optical film by analyzing the image.

Advantageous Effects

According to an exemplary embodiment of the present invention, it is possible to easily detect defects having various shapes such as crushed, stabbed, folded, and wrinkled shapes in/on the optical film.

According to an exemplary embodiment of the present invention, since the light irradiation width of the light emitted from the light emitting unit is expanded by the reflection unit, it is possible to widen a region in which a defect of the optical film can be detected.

According to an exemplary embodiment of the present invention, it is possible to easily detect a defect existing in/on the optical film.

DETAILED DESCRIPTION

Throughout the specification, unless explicitly described to the contrary, the word "comprise" and variations such as "comprises" or "comprising" will be understood to imply the inclusion of stated elements but not the exclusion of any other elements. When one member is disposed "on" another member in the present specification, this includes not only a case where the one member is brought into contact with another member, but also a case where still another member is present between the two members.

Hereinafter, the present specification will be described in more detail.

An exemplary embodiment of the present invention provides a device for detecting a defect of an optical film, the device including: a light emitting unit which emits light; a reflection unit which reflects the light emitted from the light emitting unit and guides the light to the optical film; a screen which displays a projection shape obtained by projecting the light on the optical film to detect a defect of the optical film; and an image capturing unit which captures an image of the projection shape displayed on the screen.

According to an exemplary embodiment of the present invention, it is possible to easily detect defects having various shapes such as crushed, stabbed, folded, and wrinkled shapes in/on the optical film.

According to an exemplary embodiment of the present invention, the device for detecting a defect of an optical film can check whether a defect exists in/on an optical film used to manufacture a display unit. The optical films include a polarizing film, and can further include films having optical characteristics, such as a phase difference film, a visual compensation film, and a brightness improving film, in addition to the polarizing film. That is, the optical film can be made by attaching a film having optical characteristics to one surface or both surfaces of the polarizing film. In addition, the optical film can be in the form of a sheet or a roll elongated in a longitudinal direction of the optical film.

Figure 1:
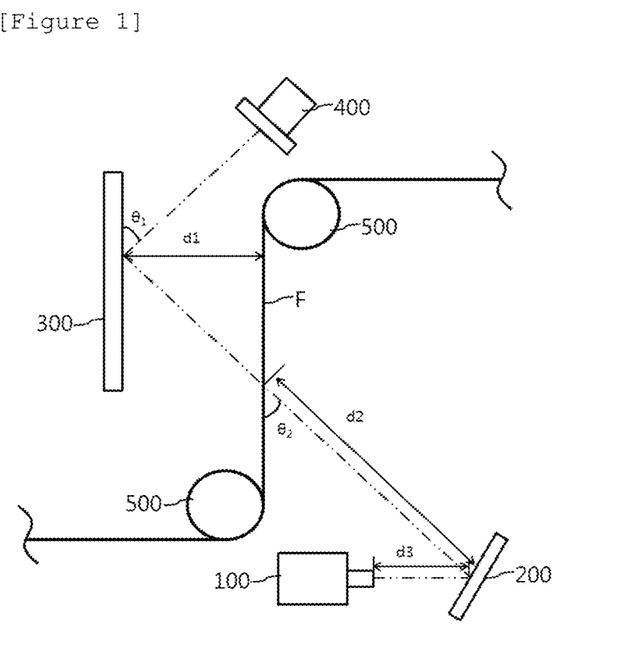
FIG. 1 is a view schematically illustrating a configuration of a device for detecting a defect of an optical film according to an exemplary embodiment of the present invention.

FIG. 1 is a view schematically illustrating a configuration of a device for detecting a defect of an optical film according to an exemplary embodiment of the present invention. Specifically, FIG. 1 is a view illustrating a device for detecting a defect of an optical film, the device including: a conveying unit 500 which conveys an optical film F; a light emitting unit 100 which emits light; a reflection unit 200 which reflects the light emitted from the light emitting unit 100 and guides the light to the optical film F; a screen 300 which is provided at a position spaced apart from the optical film F and on which a projection shape, which is made by projecting a defect existing in/on the optical film F by the light, is displayed; and an image capturing unit 400 which captures an image of the projection shape displayed on the screen 300.

According to an exemplary embodiment of the present invention, the device for detecting a defect of an optical film can include the conveying unit that can convey the optical film in a predetermined direction. The conveying unit can include various conveying means that can convey the optical film. Specifically, the conveying unit includes conveying rollers and can convey the optical film by using the conveying rollers.

According to an exemplary embodiment of the present invention, a diameter of the conveying roller can be 100 mm to 125 mm or 110 mm to 120 mm. Specifically, the diameter of the conveying roller can be 118 mm. In addition, referring to FIG. 1, a shortest distance between centers of two conveying rollers 500 can be 200 mm to 300 mm, 220 mm to 280 mm, or 240 mm to 260 mm. Specifically, the shortest distance between the centers of the two conveying rollers can be 245 mm. The distance between the centers of the conveying rollers can be measured in a direction in which the optical film is conveyed.

Since the dim titer of the conveying roller and the shortest distance between the centers of the conveying rollers are adjusted to the aforementioned ranges, it is possible to improve operational efficiency of the device for detecting a defect of an optical film, and it is possible to effectively prevent a situation in which the conveying rollers interfere with the light reflected by the reflection unit and a situation in which the conveying rollers interfere with the image capturing unit when the image capturing unit captures an image of the screen.

According to an exemplary embodiment of the present invention, the conveying rollers can convey the optical film in an in-line manner in which the optical film travels in a single direction. Therefore, the optical film can be continuously conveyed along the conveying rollers while being wound around the conveying rollers, and the light emitted from the light emitting unit can be reflected by the reflection unit and guided to the optical film being conveyed. That is, according to an exemplary embodiment of the present invention, a roll of the optical film, which is elongated in a longitudinal direction thereof, can be supplied, by using a roll-to-roll process, to the device for detecting a defect of an optical film, such that a defect of the optical film can be detected.

According to an exemplary embodiment of the present invention, in the case in which whether a defect exists in/on the optical film, which is elongated in the longitudinal direction thereof, is checked by the device for detecting a defect of an optical film, the conveying unit can convey the optical film in the longitudinal direction of the optical film. Referring to FIG. 1, the conveying unit 500 can be provided to convey the optical film F in the longitudinal direction of the optical film F in a state in which the optical film F is positioned between the screen 300 and the light emitting unit 100 and reflection unit 200.

According to an exemplary embodiment of the present invention, a publicly known means can be used as the light emitting unit and there is no limitation as long as the means emits light. Specifically, the light emitting unit can include a light emitting diode (LED) in consideration of a lifespan, brightness stability, and maintainability of the light emitting unit. In addition, the light emitting unit can include multiple LEDs and can include light emitting means such as a fluorescent lamp or an incandescent lamp other than the LED.

According to an exemplary embodiment of the present invention, the reflection unit can include a means capable of changing a path of light emitted from the light emitting unit. Specifically, the reflection unit can include a flat reflective mirror. Since the reflection unit includes the flat reflective mirror, a reflection angle of the light emitted from the light emitting unit with respect to the reflection unit can be easily adjusted, and as a result, the light can be effectively guided to the optical film.

Figure 2:
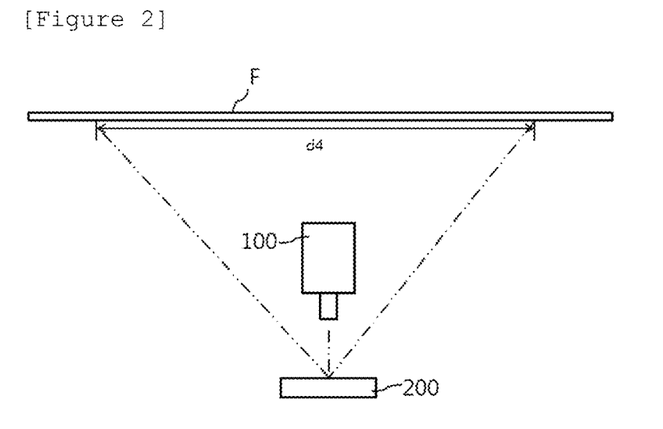
FIG. 2 is a view schematically illustrating a state in which light emitted from a light emitting unit is guided to an optical film by a reflection unit according to an exemplary embodiment of the present invention.

FIG. 2 is a view schematically illustrating a state in which the light emitted from the light emitting unit is guided to the optical film by the reflection unit according to an exemplary embodiment of the present invention. Specifically, referring to FIG. 2, the light emitted from the light emitting unit 100 can be reflected by the reflection unit 200 and guided to the optical film F.

According to an exemplary embodiment of the present invention, the reflection unit can guide the light to the optical film while expanding a light irradiation width of the light. The light irradiation width of the light can be expanded while the path of the light is changed to be directed toward the optical film as the light emitted from the light emitting unit is reflected by the reflection unit. That is, according to an exemplary embodiment of the present invention, since the light irradiation width of the light emitted from the light emitting unit is expanded by the reflection unit, it is possible to widen a region in which a defect of the optical film can be detected.

Referring to FIG. 2, a light irradiation width d4 of the light emitted from the light emitting unit 100 can be expanded in a width direction of the optical film F by the reflection unit 200. A device in the related art, which detects a defect of an optical film by emitting light directly onto the optical film without using the reflection unit, is provided with multiple light emitting units in order to expand a region in which a defect of the optical film is detected. In contrast, according to an exemplary embodiment of the present invention, only the single light emitting unit can be provided because the light irradiation width can be expanded by using the reflection unit, and as a result, it is possible to reduce installation costs for the device for detecting a defect of an optical film. In addition, since only the single light emitting unit is provided, it is possible to reduce an installation space for the device for detecting a defect of an optical film, and it is possible to reduce costs required to operate the device for detecting a defect of an optical film.

According to an exemplary embodiment of the present invention, the reflection unit can guide the light emitted from the light emitting unit to the optical film so that the light irradiation width is 900 mm or more. Referring to FIG. 2, the reflection unit can guide the light to the optical film so that the light irradiation width d4 is 900 mm to 3,000 mm, 900 mm to 2,500 mm, 900 mm to 1,500 mm, 1,500 mm to 3,000 mm, or 1,700 mm to 2,500 mm.

Since the light irradiation width of the light reflected by the reflection unit is adjusted to the aforementioned ranges, it is possible to effectively guide the light in the entire width direction of the optical film, and it is possible to prevent uniformity of the amount of light from deteriorating.

According to an exemplary embodiment of the present invention, the light irradiation width of the light being guided to the optical film can be controlled by adjusting a distance between the light emitting unit and the reflection unit. Specifically, it is possible to expand the light irradiation width of the light being guided to the optical film by decreasing the distance between the light emitting unit and the reflection unit. In addition, it is possible to reduce the light irradiation width of the light being guided to the optical film by increasing the distance between the light emitting unit and the reflection unit.

According to an exemplary embodiment of the present invention, the light, which is guided to the optical film by the reflection unit, is projected on the optical film, and a projection shape, which is made by projecting the light on the optical film so that a defect existing in/on the optical film is projected, can be displayed on the screen.

According to an exemplary embodiment of the present invention, a screen, which is utilized to project light, can be used as the screen. Specifically, a polypropylene sheet can be used for the screen. In addition, a surface of the screen can be processed to be white so that the projection shape, which is made by projecting a defect existing in/on the optical film, can be clearly displayed on the screen. In addition, to minimize distortion of the projection shape displayed on the screen, the surface of the screen is processed to reduce surface roughness of the screen. In addition, the screen can have light diffusion and transmission properties.

A defect existing in/on the optical film can have various shapes such as crushed, stabbed, folded, or wrinkled shapes of the optical film caused by external force. In more detail, a defect existing in/on the optical film can mean a crushed shape of the optical film caused by introduction of foreign substances, a crushed shape formed when the optical film is wound around the conveying roller, a crushed shape formed when a thickness of a bonding agent or an adhesive agent applied onto the optical film is deformed, or a defect in which a front or rear shape of the optical film is distorted or a shape of the optical film is changed by wrinkles formed when the optical film is folded.

According to an exemplary embodiment of the present invention, it is possible to ascertain the type and a size of a defect existing in/on the optical film by analyzing the projection shape displayed on the screen. Specifically, when the optical film is crushed and thus has a convex shape (e.g., in the form of a magnifying glass), brightness of the projection shape displayed on the screen is higher than brightness of a projection shape of an optical film having no defect, and as a result, the projection shape in the form of a white spot can be displayed on the screen.

In addition, in a case in which foreign substances are introduced into the optical film, the light guided by the reflection unit cannot pass through the optical film, and as a result, brightness of the projection shape displayed on the screen is lower than brightness of a projection shape of an optical film having no defect, such that the projection shape in the form of a black spot can be displayed on the screen. In addition, in a case in which the optical film is folded or the optical film is stabbed, the projection shape displayed on the screen can be displayed in the form of a line including white or black spots which are continuously connected and elongated.

Therefore, according to an exemplary embodiment of the present invention, it is possible to ascertain the type and a size of a defect existing in/on the optical film by analyzing the projection shape displayed on the screen, and as a result, it is possible to determine whether the optical film has a defect.

According to an exemplary embodiment of the present invention, the image capturing unit can be provided to be spaced apart from the screen and can obtain an image of the projection shape displayed on the screen by capturing the image of the projection shape. A method of obtaining an image can be performed by capturing the image of the projection shape, which is displayed on the screen by a defect of the optical film, by using a camera included in the image capturing unit, and by converting the image into image data. A CCD sensor or a scanning camera can be used as the camera included in the image capturing unit, but the type of camera is not limited. In addition, to minimize distortion of the captured image of the projection shape displayed on the screen, a focal point of the image capturing unit can be set to be formed at a center of the screen.

According to an exemplary embodiment of the present invention, the number of image capturing units can be more than one. Therefore, the device for detecting a defect of an optical film can include a single light emitting unit and multiple image capturing units. The multiple image capturing units can capture images of image capturing regions, respectively, which can be defined on the screen. Specifically, in a case in which a screen having a rectangular shape having a horizontal length greater than a vertical length is used, the multiple image capturing units can capture images of the image capturing regions, respectively, which are defined in the horizontal direction of the screen. As an example, in a case in which a setting is made such that a first image capturing region, a second image capturing region, and a third image capturing region are defined on the screen, a first image capturing unit can capture an image of a projection shape on the first image capturing region, a second image capturing unit can capture an image of a projection shape on the second image capturing region, and a third image capturing unit can capture an image of a projection shape on the third image capturing region. Since the multiple image capturing units are provided, the images of the projection shapes, which are widely distributed on the screen, can be precisely captured, and as a result, it is possible to more accurately detect a defect of an optical film.

Figure 3:
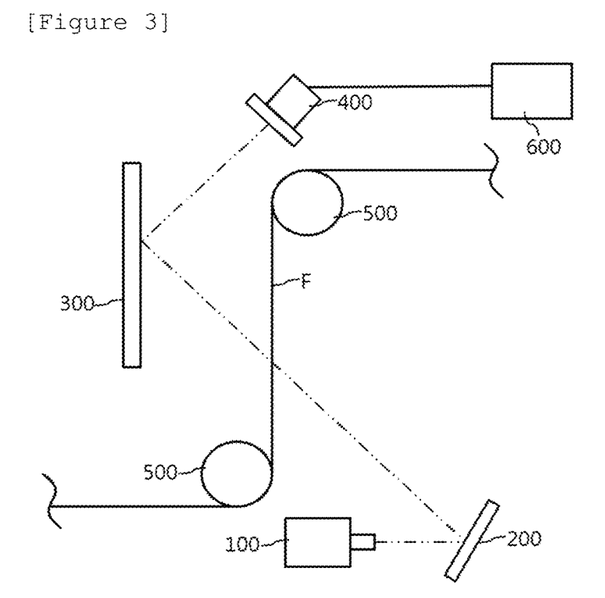
FIG. 3 is a view schematically illustrating a configuration of the device for detecting a defect of an optical film which includes an analysis unit according to an exemplary embodiment of the present invention.

FIG. 3 is a view schematically illustrating a configuration of the device for detecting a defect of an optical film which includes an analysis unit according to an exemplary embodiment of the present invention. Specifically, FIG. 3 is a view illustrating the device for detecting a defect of an optical film which has an analysis unit 600 that operates in conjunction with the image capturing unit 400 and determines whether a defect exists in/on the optical film F by analyzing an image captured by the image capturing unit 400.

According to an exemplary embodiment of the present invention, the device for detecting a defect of an optical film can further include the analysis unit which detects a defect of the optical film by analyzing an image of the screen which is captured by the image capturing unit to display the projection shape. The analysis unit uses image data, as input data, obtained by the image capturing unit, and can perform image processing by using numerical values regarding brightness of images in the inputted image data. An analyzing process, which detects a defect by determining whether the projection shape of the optical film has a black spot or a white spot by comparing a brightness value of the projection shape with a brightness value of a projection shape of an optical film having no defect, can be performed on the data that has been subjected to the image processing. In addition, the analysis unit can analyze the defect by measuring a size of a portion having a black spot or a white spot.

The analysis unit can include an electronic device embedded with an analysis program capable of performing image processing and comparative analysis. Specifically, a computer, a tablet PC, a personal portable phone, a wearable device, a programmable logic controller (PLC), or the like can be used as the analysis unit.

According to an exemplary embodiment of the present invention, a first angle $\theta_1$ formed between the screen and a direction in which the image capturing unit captures an image of the screen can be equal to a second angle $\theta_2$ formed between the optical film and the light projected on the optical film.

Referring to FIG. 1, a position of the image capturing unit 400, a position of the light emitting unit 100, or a position of the reflection unit 200 can be adjusted such that the first angle $\theta_1$ formed between the screen 300 and the direction in which the image capturing unit 400 captures the image of the screen 300 is set to be equal to the second angle $\theta_2$ formed between the optical film F and the light projected on the optical film F. Specifically, the second angle can be adjusted by fixing the position of the reflection unit and adjusting the position of the light emitting unit or by fixing the position of the light emitting unit and adjusting the position of the reflection unit.

According to an exemplary embodiment of the present invention, since the first angle and the second angle are set to be equal to each other, distortion of the projection shape displayed on the screen is minimized, such that it is possible to reduce an error occurring while analyzing the captured image of the projection shape, and it is possible to more accurately detect a defect existing in/on the optical film.

According to an exemplary embodiment of the present invention, the first angle and the second angle can be from 25° or more to 48° or less. Specifically, the first angle and the second angle can be from 30° or more to 40° or less, from 35° or more to 40° or less, or from 30° or more to 45° or less. More specifically, the first angle and the second angle can be 35°.

Since the first angle and the second angle are adjusted to the aforementioned ranges, it is possible to minimize distortion of the projection shape displayed on the screen, and it is possible to more precisely obtain the captured image of the projection shape. In addition, in the case in which the first angle and the second angle are equal to each other and the first angle and the second angle are within the aforementioned ranges, it is possible to more precisely detect a defect existing in/on the optical film by inhibiting an average peak brightness value of the defect of the optical film detected by the image capturing unit from being reduced.

In the present invention, the brightness values refer to degrees of brightness of images obtained by the image capturing unit and can be set from 0 to 255 levels by being classified based on gray levels. In this case, the 0 level refers to a case in which brightness of an image corresponds to black, and the 255 level refers to a case in which brightness of an image corresponds to white. In addition, the average peak brightness value of the defect of the optical film can mean an average value of a difference in brightness value (gray level) between a region in which no defect is detected in the obtained image and a region in which a defect is detected.

In a case in which the first angle and the second angle are smaller than 25°, distortion of the projection shape displayed on the screen can be increased, and the angle formed between the screen and the direction in which the image capturing unit captures an image of the screen is decreased, and as a result, there can be a problem in that a projection shape is omitted from an image captured by the image capturing unit and thus an incorrect image is obtained. In addition, in a case in which the first angle and the second angle are smaller than 25°, the light and the conveying unit interfere with each other while the light, which is emitted from the light emitting unit and reflected by the reflection unit, is guided to the optical film, and as a result, there can be a problem in that an incorrect image is obtained.

Figure 4A:
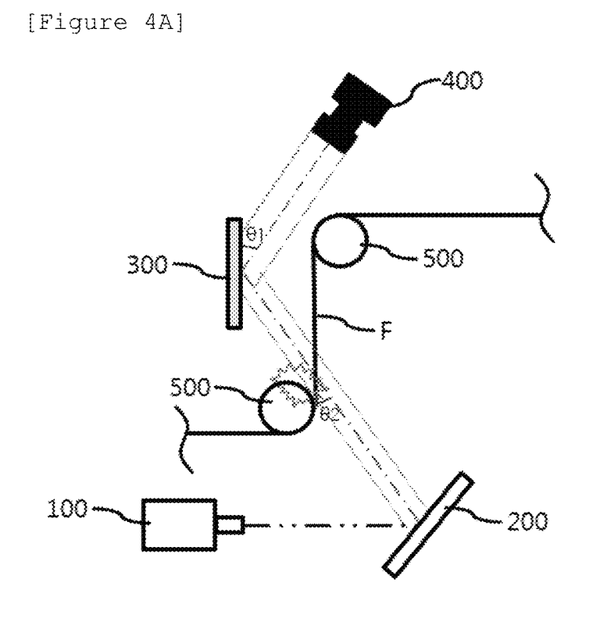
FIG. 4A is a view schematically illustrating a state in which interference occurs between light reflected by the reflection unit and a conveying unit when first and second angles are smaller than 25°.

FIG. 4A is a view schematically illustrating a state in which the light reflected by the reflection unit and the conveying unit interfere with each other when the first angle and the second angle are smaller than 25°. Specifically, FIG. 4A is a view illustrating a state in which the light reflected by the reflection unit 200 and the conveying unit 500 interfere with each other when the first angle $\theta_1$ and the second angle $\theta_2$ are smaller than 25°.

In a case in which the first angle and the second angle are larger than 48°, there can be a problem in that uniformity of the amount of light is decreased because the light guided by the reflection unit undergoes interface reflection or irregular reflection on the optical film. In addition, in a case in which the first angle and the second angle are larger than 48°, the light interferes with the conveying unit while the image capturing unit captures an image of the screen, and as a result, there can be a problem in that an incorrect image is obtained.

Figure 4B:
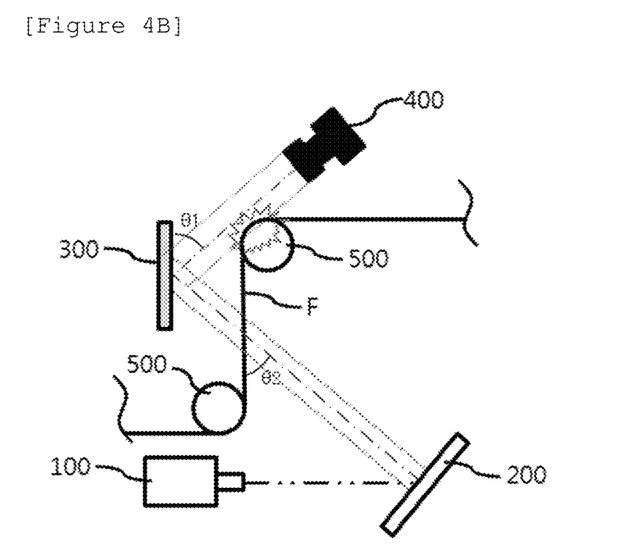
FIG. 4B is a view schematically illustrating a state in which light interferes with the conveying unit while an image capturing unit captures an image of a screen when the first and second angles are larger than 48°.

FIG. 4B is a view schematically illustrating a state in which the light interferes with the conveying unit while the image capturing unit captures an image of the screen when the first angle and the second angle are larger than 48°. Specifically, FIG. 4B is a view illustrating a state in which a region in which the image capturing unit 400 obtains an image of the screen 300 that interferes with the conveying unit 500 when the first angle $\theta_1$ and the second angle $\theta_2$ are larger than 48°.

According to an exemplary embodiment of the present invention, a distance between the screen and a region of the optical film on which the light is projected can be from 90 mm or more to 130 mm or less. Specifically, the distance between the screen and the region of the optical film on which the light is projected can be from 100 mm or more to 120 mm or less or from 105 mm or more to 115 mm or less. More specifically, the distance between the screen and the region of the optical film on which the light is projected can be 90 mm. In the present invention, the region of the optical film on which the light is projected can mean a region of the optical film which is positioned at a side of the screen, and the distance between the screen and the region of the optical film on which the light is projected can mean a shortest distance.

Referring to FIG. 1, since the distance d1 between the screen 300 and the region of the optical film F on which the light is projected is adjusted to the aforementioned ranges, a projection shape, which is made by foreign substances such as dust existing between the optical film and the screen, can be effectively prevented from being displayed on the screen, and the projection shape, which is made by projecting a defect existing in/on the optical film, can be more clearly displayed on the screen.

According to an exemplary embodiment of the present invention, a distance between a point on the light emitting unit from which light is emitted and a point on the reflection unit on which light is reflected can be 165 mm or more and 185 mm or less. Specifically, the distance between the point on the light emitting unit at which the light is emitted and the point on the reflection unit at which the light is reflected can be 170 mm or more and 180 mm or less. More specifically, the distance between the point on the light emitting unit at which the light is emitted and the point on the reflection unit at which the light is reflected can be 175 mm.

Referring to FIG. 1, the distance d3 between the point on the light emitting unit 100 at which the light is emitted and the point on the reflection unit 200 at which the light is reflected is adjusted to the aforementioned ranges, such that the light can be guided to the optical film in a state in which intensity of the light reflected by the reflection unit is appropriately maintained. Therefore, the projection shape, which is made by projecting a defect existing in/on the optical film, can be clearly displayed on the screen. In addition, since the distance d3 is adjusted to the aforementioned ranges, the reflection unit can effectively expand the light irradiation width of the light emitted from the light emitting unit.

According to an exemplary embodiment of the present invention, a distance between the point on the reflection unit at which the light is reflected and the region of the optical film to which the light reflected by the reflection unit is guided can be 580 mm or more and 650 mm or less. Specifically, the distance between the point on the reflection unit at which the light is reflected and the region of the optical film to which the light reflected by the reflection unit is guided can be from 590 mm or more to 630 mm or less, from 600 mm or more to 610 mm or less, from 590 mm or more to 610 mm or less, or from 620 mm or more to 650 mm or less. More specifically, the distance between the point on the reflection unit at which the light is reflected and the region of the optical film to which the light reflected by the reflection unit is guided can be 650 mm. In the present invention, the region of the optical film to which the light reflected by the reflection unit is guided can mean a region of the optical film which is positioned at a side of the reflection unit. Referring to FIG. 1, since the distance d2 between the point on the reflection unit 200 at which the light is reflected and the region of the optical film F to which the light is guided is adjusted to the aforementioned ranges, uniformity of the amount of light, which is guided to the optical film by the reflection unit, is prevented from deteriorating, and the light can be effectively projected on the optical film.

According to an exemplary embodiment of the present invention, the device for detecting a defect of an optical film can be provided in a darkroom so that distortion of the projection shape displayed on the screen is minimized and the projection shape can be more clearly displayed on the screen.

A distance between the image capturing unit and the screen can be changed based on resolution of the camera included in the image capturing unit.

Another exemplary embodiment of the present invention provides a method of detecting a defect of an optical film, the method including: emitting light to a reflection unit; projecting the light reflected by the reflection unit on the optical film; obtaining an image by capturing the image of a screen which displays a projection shape obtained by projecting the light on the optical film to detect a defect of the optical film; and detecting the defect of the optical film by analyzing the image.

According to an exemplary embodiment of the present invention, it is possible to easily detect a defect existing in/on the optical film.

The light emitting unit, the reflection unit, the screen, the image capturing unit, and the like used for the method of detecting a defect of an optical film according to an exemplary embodiment of the present invention can be identical to the light emitting unit, the reflection unit, the screen, the image capturing unit, and the like included in the device for detecting a defect of an optical film according to an exemplary embodiment of the present invention.

According to an exemplary embodiment of the present invention, light can be emitted to the reflection unit by using the light emitting unit. When the light is emitted to the reflection unit, the light is reflected by the reflection unit and guided to the optical film, and the light, which is guided to the optical film, is projected on the optical film and reaches the screen. As the light is projected on the optical film, the projection shape, which is made by projecting a defect existing in/on the optical film, can be displayed on the screen. It is possible to obtain the image by capturing the image of the projection shape displayed on the screen by using the image capturing unit. It is possible to detect a defect of the optical film by analyzing the obtained image by using the analysis unit.

According to an exemplary embodiment of the present invention, the method of detecting a defect of an optical film can further include supplying the optical film by using a roll-to-roll process. Specifically, a roll of the optical film, which is elongated in the longitudinal direction thereof is supplied in the longitudinal direction of the optical film by using the roll-to-roll process, and a defect of the optical film can be detected. Therefore, according to an exemplary embodiment of the present invention, since the optical film is supplied by using the roll-to-roll process, it is possible to improve a speed of the process of detecting a defect of the optical film, and it is possible to continuously perform a defect detecting process.

DESCRIPTION OF ITEM NUMBERS

100: Light emitting unit
200: Reflection unit
300: Screen
400: Image capturing unit
500: Conveying unit
600: Analysis unit

EXAMPLES

Hereinafter, the present invention will be described in detail with reference to Examples for specifically describing the present invention. However, the Examples according to the present invention can be modified in various forms, and it is not interpreted that the scope of the present invention is limited to the Examples to be described in detail below. The Examples of the present specification are provided for more completely explaining the present invention to the person with ordinary skill in the art.

Example 1

The light emitting unit, the reflection unit, the screen, the image capturing unit, and the conveying unit of the device for detecting a defect of an optical film were set as illustrated in FIG. 1. In this case, the first angle $\theta_1$ and the second angle $\theta_2$ were set to 35°. In addition, the distance d1 between the screen and the region of the optical film to which the light is projected was set to 90 mm, the distance d3 between the point on the light emitting unit at which the light is emitted and the point on the reflection unit at which the light is reflected was set to 175 mm, and the distance d2 between the point on the reflection unit at which the light is reflected and the region of the optical film to which the light reflected by the reflection unit is guided was set to 650 mm. In addition, the conveying rollers having a diameter of 118 mm were used, and a shortest distance between the centers of the two conveying rollers in FIG. 1 was set to 245 mm.

Comparative Example 1

A device for detecting a defect of an optical film was set in the same manner as in Example 1, except that the first angle $\theta_1$ was set to 15° and the second angle $\theta_2$ was set to 35°.

Comparative Example 2

A device for detecting a defect of an optical film was set in the same manner as in Example 1, except that the first angle $\theta_1$ was set to 35° and the second angle $\theta_2$ was set to 55°.

Average peak brightness values were measured from images which are obtained by image capturing units of the devices for detecting a defect of an optical film according to Example 1, Comparative Example 1, and Comparative Example 2, and results thereof are shown in the following Table 1. In this case, as described above, the average peak brightness value in Table 1 means an average value of a difference in brightness value (gray level) between a region in which no defect is detected in the obtained image and a region in which a defect is detected.

TABLE 1

|  | Average Peak Brightness Value (Gray Level) | Reduction Ratio (%) |
| --- | --- | --- |
| Example 1 | 36 | — |
| Comparative Example 1 | 31 | 14 |
| Comparative Example 2 | 3 | 92 |

In Table 1, the reduction ratio is made by calculating a degree to which the average peak brightness values measured in Comparative Example 1 and Comparative Example 2 are reduced based on the average peak brightness value measured in Example 1.

Figure 5A:
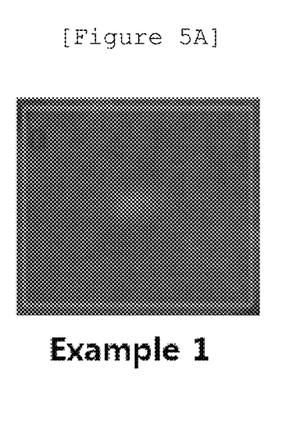
FIG. 5A-5C are views illustrating images of optical films obtained according to Example 1 (FIG. 5A), Comparative Example 1 (FIG. 5B), and Comparative Example 2 (FIG. 5C).
Figure 5B:
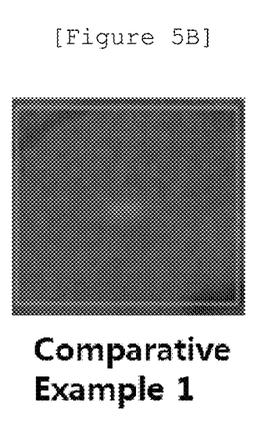
Figure 5C:
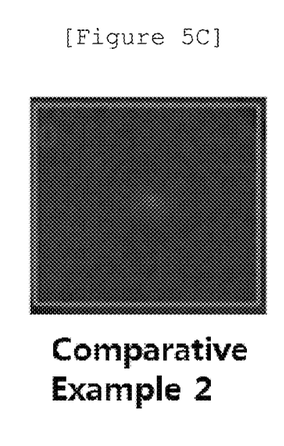

FIGS. 5A-5C illustrate the images of the optical films obtained according to Example 1 (FIG. 5A), Comparative Example 1 (FIG. 5B), and Comparative Example 2 (FIG. 5C).

Referring to Table 1 and FIGS. 5A-5C, it was ascertained that in the case of Example 1 in which the first angle and the second angle are set to be equal to each other and the first angle and the second angle are set to 25° to 48°, a defect in the optical film can be more clearly detected in the image of the optical film which is obtained by the image capturing unit. In contrast, it was ascertained that in the case of Comparative Example 1 in which the first angle and the second angle are different from each other and the first angle is 15° and in the case of Comparative Example 2 in which the first angle and the second angle are different from each other and the second angle is 55°, the average peak brightness values of the images obtained by the image capturing units were smaller than the average peak brightness value in Example 1 and the process of detecting a defect in the optical film from the obtained image was not easily performed in comparison with the process in Example 1.

Therefore, it can be seen that it is possible to more effectively detect a defect in the optical film by using the device for detecting a defect of an optical film according to an exemplary embodiment of the present invention.

The invention claimed is:

1. A device for detecting a defect of an optical film, the device comprising:
a light emitting unit which emits light;
a reflection unit which reflects the light emitted from the light emitting unit and guides the light to the optical film;
a screen which displays a projection shape obtained by projecting the light on the optical film to detect a defect of the optical film; and
an image capturing unit which captures an image of the projection shape displayed on the screen;
wherein a traveling direction of the optical film is parallel to the screen.

2. The device of claim 1, wherein a first angle formed between the screen and a direction in which the image capturing unit captures the image of the screen is equal to a second angle formed between the optical film and the light projected on the optical film.

3. The device of claim 2, wherein the first angle and the second angle are 25° or more and 48° or less.

4. The device of claim 1, wherein a distance between the screen and a region of the optical film on which the light is projected is 90 mm or more and 130 mm or less.

5. The device of claim 1, wherein a distance between a point on the light emitting unit from which the light is emitted and a point on the reflection unit on which light is reflected is 165 mm or more and 185 mm or less.

6. The device of claim 1, wherein a distance between a point on the reflection unit on which the light is reflected and a region of the optical film to which the light reflected by the reflection unit is guided is 580 mm or more and 650 mm or less.

7. The device of claim 1, further comprising:
- an analysis unit which detects a defect of the optical film by analyzing an image of the screen which is captured by the image capturing unit to display the projection shape.

8. A method of detecting a defect of an optical film, the method comprising:
- emitting light to a reflection unit;
- projecting the light reflected by the reflection unit on the optical film;
- obtaining an image by capturing the image of a screen which displays a projection shape obtained by projecting the light on the optical film to detect a defect of the optical film; and
- detecting the defect of the optical film by analyzing the image;
- wherein a traveling direction of the optical film is parallel to the screen.

9. The method of claim 8, further comprising:
supplying the optical film by using a roll-to-roll process.

* * * * *